R. S. PEASE.
METHOD OF DRAWING GLASS.
APPLICATION FILED OCT. 19, 1912.
1,119,867.
Patented Dec. 8, 1914.
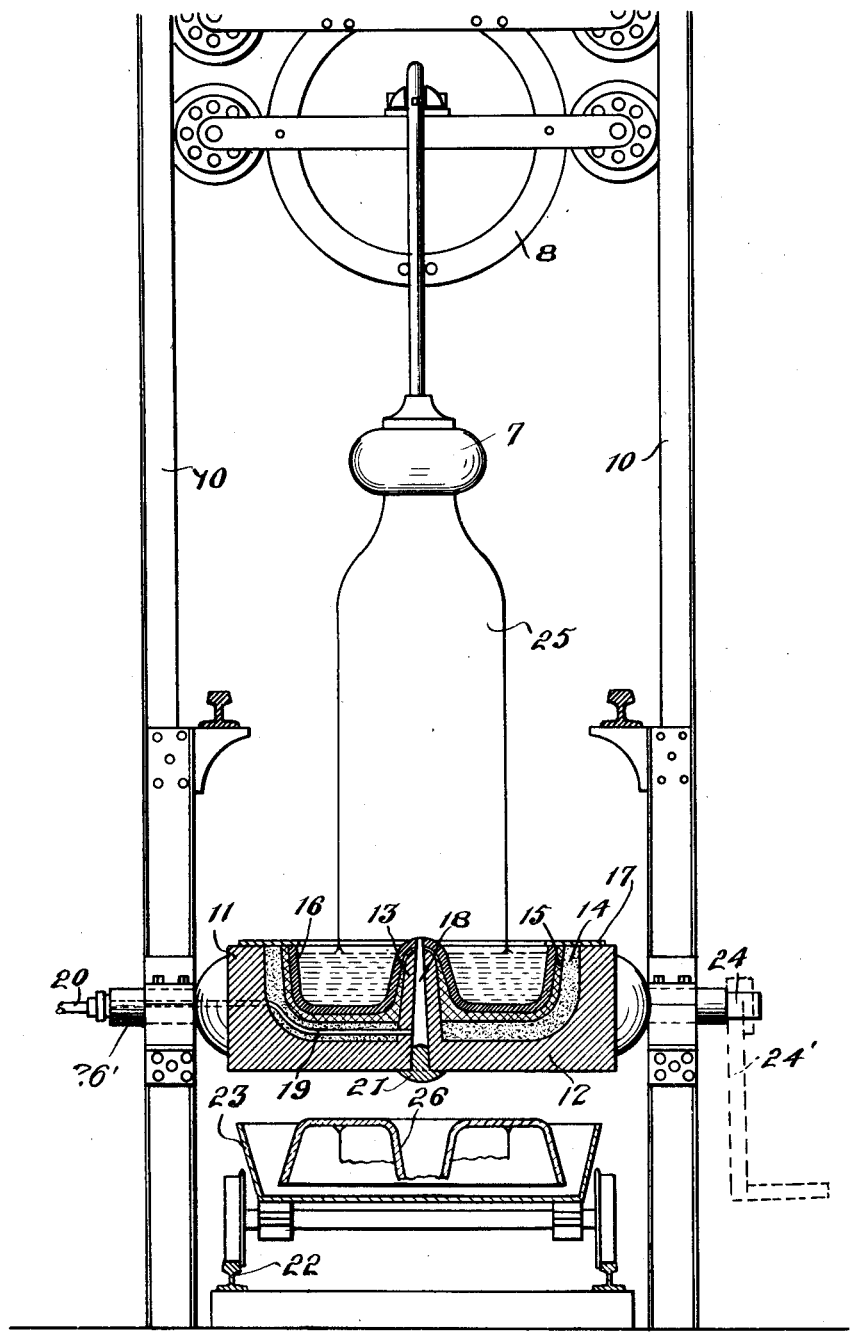

UNITED STATES PATENT OFFICE.

ROGER S. PEASE, OF PITTSBURGH, PENNSYLVANIA, ASSIGNOR TO PITTSBURGH PLATE GLASS COMPANY, OF PITTSBURGH, PENNSYLVANIA, A CORPORATION OF PENNSYLVANIA.

METHOD OF DRAWING GLASS.

1,119,867. Specification of Letters Patent. Patented Dec. 8, 1914.

Application filed October 19, 1912. Serial No. 726,755.

*To all whom it may concern:*

Be it known that I, ROGER S. PEASE, a citizen of the United States, residing at Pittsburgh, in the county of Allegheny and State of Pennsylvania, have invented certain new and useful Improvements in Methods of Drawing Glass, of which the following is a specification.

The invention relates to a method of drawing glass, and particularly to the drawing of glass cylinders for the manufacture of window glass and the like, and it has among its primary objects; the provision of an improved method of drawing glass whereby superiority of product is obtained and the loss from breakage from defects is reduced to a minimum; the provision of a method whereby the drawing operation is simplified and at the same time greatly expedited; the provision of a method whereby economy in fuel consumption is effected; and in general the provision of a method whereby the cost of production is lessened by virtue of the quality attained and the simplicity and rapidity of the operation. These, together with such other objects as may hereinafter appear, or are incident to my invention, I attain by a method illustrated in the accompanying drawing wherein the figure illustrates the drawing of a glass cylinder.

In drawing glass from a tank or from other receptacles considerable difficulty is occasioned by the residual portions of glass remaining from a draw, these portions comprising a body of relatively cool glass adjacent the point of drawing, and such portions of the glass as are cut off or may have broken off from the cylinder. The presence of these portions of glass occasions a period of delay incident to reheating such portions to proper drawing consistency, and causes breakage in the succeeding draws, as the texture of such portions changes so that it is defective for drawing purposes, especially where the reheating operation has not been carried to sufficient length. The loss of time and the breakages increase the cost of production to a prohibitive amount. In drawing from a pot the residual portions must be removed, and this is accomplished by melting out the glass from the pot, thereby increasing fuel consumption. My invention contemplates broadly the provision of a simple and expeditious method whereby such portions of glass are entirely removed bodily and the cost of production greatly lessened by reducing the amount of fuel consumed and expediting the process of manufacture, while at the same time the quality of the articles drawn is improved.

My invention will be clear from an inspection of the drawing. I have there shown a drawing bait 7 which is supported from a carriage 8 slidably mounted on the guides or frame 10. A drawing pot 11 is trunnioned in the lower part of the frame in such manner that it can be inverted. The pot comprises a body portion 12, preferably composed of metal, which is hollowed out to form a glass containing receptacle the sides of which slope outwardly. The surface of the pot is covered with a layer 14 of sand or other heat retaining material, a layer 15 of paste adapted to retain the sand in position, and a lining of copper 16 or other material to which the glass will not adhere. The lining may be readily removed, and it, together with the layers of sand and paste are maintained in position in the pot by means of the removable annular plate 17. A core or standard 13 projects upwardly in the central portion of the pot and serves to position the cylinder being drawn and keep it in vertical alinement as the drawing proceeds. The air needed for the drawing operation is supplied to the cylinder from beneath through port 18 formed in the standard 13, the port 19 and the pipe 20 which extends from any suitable source of supply and leads to the trunnion 26' through which the port 19 extends. Glass which works its way into the port 18 can readily be removed by taking out the plug 21. The other trunnion 24 is provided with a squared end to receive a handle 24' by means of which the pot may be turned. Extending beneath the drawing pot is a track 22 upon which the car 23 is adapted to travel.

The operation is as follows: The pot is turned to the position indicated and is filled with molten glass in any preferred manner, after which the bait is immersed in the glass and then elevated, drawing a cylinder 25 of the usual character, air being supplied as previously pointed out. After the cylinder is completed it is cut off adjacent the pot. The unused portions of the charge of glass together with such portions of the cylinder which have been cut off or may have broken off remain in the pot. This residual glass is usually in the form of a shell 26 substantially of the configuration shown in the lower portion of the drawing. In order to remove the residual glass, the pot is turned to inverted position, whereupon the glass readily falls bodily out of the pot into the car 23, without the need of the application of heat, leaving the pot surface entirely clear and in condition to receive a fresh charge. This occurs by virtue of the non-adhesive characteristics of the pot, and because of its construction of sloping sides.

It will be seen from the foregoing that the substitution of this method for the method of drawing out of a tank dispenses with the delay and additional expense incident to the reheating of the residual portions, and that it eliminates the delay and expense incident to the melting out of such glass from a pot as is ordinarily the case in the pot drawing methods at present current. My method thus effects a saving of time, labor, and fuel, secures a superior quality of the product, and in general simplifies and expedites the drawing operation; thus obtaining a maximum production at a minimum cost. Briefly stated, the steps of the method are the charging of the pot with molten glass, the drawing and cutting off of the cylinder, and the cleaning of the pot by the removal of the residual portions of glass in the manner described.

Having thus described my invention and illustrated its use, what I claim as new and desire to secure by Letters Patent, is the following.

The herein described process of drawing glass which consists in charging an invertible receptacle to which glass will not adhere, in drawing a cylinder, and in dumping the residual glass bodily from the receptacle, and then recharging the pot without reheating the same.

In testimony whereof I have hereunto signed my name in the presence of the two subscribed witnesses.

ROGER S. PEASE.

Witnesses:
HARVEY L. LECHNER,
ARCHWORTH MARTIN.